United States Patent
Matsuki et al.

[19]

[11] Patent Number: 5,887,814
[45] Date of Patent: Mar. 30, 1999

[54] SEAT BELT RETRACTOR AND CONTROLLING METHOD OF THE SAME

[75] Inventors: Masuo Matsuki; Ganta Hibata, both of Kanagawa, Japan

[73] Assignee: NSK Ltd., Tokyo, Japan

[21] Appl. No.: 951,499

[22] Filed: Oct. 16, 1997

[30] Foreign Application Priority Data

Oct. 17, 1996 [JP] Japan ..................................... 8-275112

[51] Int. Cl.$^6$ .......................... B60R 22/28; B60R 22/415
[52] U.S. Cl. ..................................... 242/379.1; 242/382.7
[58] Field of Search .............................. 242/379.1, 382.2, 242/382.1; 280/805; 297/470, 471, 472

[56] References Cited

U.S. PATENT DOCUMENTS

| | | | |
|---|---|---|---|
| 3,741,494 | 6/1973 | Fiala ...................................... | 242/379.1 |
| 3,790,099 | 2/1974 | Beller .................................... | 242/379.1 |
| 4,811,912 | 3/1989 | Takada .................................. | 242/382.2 |
| 5,257,754 | 11/1993 | Hishon .................................. | 242/382.2 |
| 5,526,996 | 6/1996 | Ebner et al. ............................. | 242/374 |
| 5,628,469 | 5/1997 | Fohl ..................................... | 242/379.1 |

*Primary Examiner*—John M. Jillions
*Attorney, Agent, or Firm*—Sughrue, Mion, Zinn, Macpeak & Seas, PLLC

[57] ABSTRACT

A seat belt retractor according to the present invention comprises a torsion bar 2 which is connected integrally with a bobbin 3 on one end side thereof and is connected integrally with a locking base 5 on the other end side thereof, a pawl 16 for preventing the rotation of the locking base 5 in the webbing pull-out direction thereof, a ratchet wheel 18 for bringing the pawl 16 into engagement with an engaging internal teeth 25 in a vehicle emergency, a control plate 65 which, in accordance with the winding amount of a webbing 50, positions a lock lever 55 at a first position in which the lock lever 55 is engaged with the ratchet wheel 18 and the pawl 16 is engaged with the engaging internal teeth 25 or at a second position in which the lock lever 55 is not engaged with the ratchet wheel 18, and a lock member 80 which, when the lock lever 55 is positioned at the first position, can be engaged with the ratchet teeth 3*b* of the bobbin 3 to thereby prevent the rotation of the bobbin 3 in the webbing pull-out direction thereof. Accordingly, it is possible to provide an improved seat belt retractor which can switch an energy absorbing mechanism between its operation condition and its non-operation condition by use of a simple structure.

12 Claims, 10 Drawing Sheets

SEAT BELT RETRACTOR AND CONTROLLING METHOD OF THE SAME

BACKGROUND OF THE INVENTION

The present invention relates to an improved retractor (a winding device) for use in a seat belt device and, in particular, to an improved seat belt retractor which includes both an emergency lock mechanism and an automatic lock mechanism. In addition, the present invention also relates to a control method for controlling a seat belt retractor which includes an emergency lock mechanism, an automatic lock mechanism and an energy absorbing mechanism.

Conventionally, in a seat belt for holding an occupant and the like of a vehicle safely in the seat of the vehicle, there is provided a seat belt retractor which is structured such that, when restraining the body of the occupant, an emergency lock mechanism thereof can be operated, and, when fixing a baggage, a child seat or the like to the seat, an automatic lock mechanism can operated.

That is, the seat belt retractor of this type comprises a well-known emergency lock mechanism including lock means engageable with a winding shaft and capable of locking the rotation of the winding shaft in a webbing pull-out direction thereof and inertia sensing means for actuating the lock means in a vehicle emergency, and control means for actuating the emergency lock mechanism in accordance with the winding condition of the webbing to thereby cause the lock means to move to an engaging position or a non-engaging position properly with respect to the winding shaft, while the control means brings the lock means into engagement with the winding shaft to thereby lock the rotation of the winding shaft in the webbing pull-out direction thereof, so that the automatic lock mechanism can be actuated. And, conventionally, there have been proposed various seat belt retractors each of which, due to provision of the above-mentioned control means, can be surely switched from an emergency lock retractor over to an automatic lock retractor.

On the other hand, when the shock caused by a collision is extremely great, the tension of a webbing increases with the passage of time after the collision to thereby produce a sudden deceleration in the body of the occupant, so that a load to be applied to the occupant from the webbing becomes very large. In view of this, there have also been proposed various kinds of seat belt devices each structured such that it include an energy absorbing mechanism which, when a load acting on the webbing becomes equal to or greater than a preset given value, pulls out a seat belt by a given amount to thereby absorb the shock given to the body of the occupant so as to be able to protect the occupant body against the shock more surely. As the seat belt retractor having such structure, there is known the energy absorbing device designed especially for a safety belt which is disclosed in U.S. Pat. No. 3,741,494 to Fiala.

The above-mentioned energy absorbing device comprises a winding member (a bobbin) serving as a part to which the energy absorbing device transmits a force, and a holder (a retractor base) relatively rotatable with respect to the winding member, while a torsion bar is interposed between the holder and winding member. In this device, if, after the rotation of the winding shaft is caused to stop in a vehicle emergency, a load is further applied to the lock means, the torsion bar is twisted about its own axis, so that the shock energy given to the occupant body can be absorbed as the deformed version of the work of the torsion bar.

The seat belt retractor including the energy absorbing mechanism of the above-mentioned type pulls out the seat belt by a given amount when the load acting on the webbing becomes greater than the preset given value, while the pull-out amount of the seat belt is generally set according to the size of a space formed in front of an occupant seated in the seat.

In this structure, when a child seat or the like bulkier than the body of the occupant is fixed to the seat, if the seat belt is pulled out in a vehicle emergency, then there is a possibility that the child seat or the like can be contacted with the dashboard of the vehicle.

SUMMARY OF THE INVENTION

In view of this, the present invention aims at eliminating the above-mentioned problems found in the conventional seat belt retractor.

Accordingly, it is an object of the invention to provide an improved seat belt retractor which is able to switch an energy absorbing mechanism between its operation condition and its non-operation condition by use of a simple structure. In addition, it is also an object of the invention to provide a improved method of controlling a seat belt retractor.

In attaining the above object, according to the invention, there is provided a seat belt retractor, comprising: a substantially cylindrical bobbin around which a webbing is to be wound; a torsion bar inserted through the bobbin and rotatably supported by a retractor base, the torsion bar being connected integrally with the bobbin on the one end side thereof and connected integrally with the locking base on the other end side thereof; first lock member for bringing the locking base into engagement with the retractor base to thereby prevent the rotation of the locking base in the webbing pull-out direction thereof; lock operating member for operating the first lock member in a vehicle emergency; and, control member, in accordance with the winding amount of the webbing, for positioning an engaging member at a first position in which the engaging member is engaged with the lock operating member to thereby operate the first lock member or at a second position in which the engaging member is not engaged with the lock operating member, wherein the control member includes second lock member engageable with the locking base side end portion of the bobbin to thereby prevent the rotation of the bobbin in the webbing pull-out direction thereof and, when the engaging member is positioned at the first position, operates the second lock member.

According to the above structure, in an automatic lock mechanism operation condition in which the engaging member is situated at the first position, since the locking base side end portion of the bobbin is prevented by the second lock member from rotating in the webbing pull-out direction, no torsional force is applied to the torsion bar, so that the energy absorbing mechanism is not operated.

However, when a load equal to or greater than a given value is applied to the second lock member, preferably, the locking of the locking base side end portion of the bobbin by the second lock member may be removed.

In addition, the above-mentioned object can be attained by a seat belt retractor according to the present invention, comprising:

a base;

a bobbin around which a webbing is to be wound and coupled with the webbing;

a torsion bar inserted through the bobbin and rotatably supported by the base, the torsion bar being connected integrally with the bobbin on the one end side thereof;

first lock structure capable of making a first condition in which the other end side of the torsion bar is connected with the base and a second condition in which the other end side of the torsion bar is disconnected with the base;

control members, in accordance with the winding amount of the webbing, switched between an operable position causing the first lock structure to be in the first condition and an inoperable position in which the first lock structure is independent of the control members;

a second lock structure capable of making a coupling condition in which the base and the bobbin are coupled with each other and a decoupling condition in which the base and the bobbin are decoupled with each other, wherein when the control members is in the operable position, the second lock structure is brought in the coupling condition.

In the above-mentioned construction of the seat belt retractor the first lock structure may comprises:

a lock teeth formed on the base;

a pawl disposed on the other end side of the torsion bar and engageable with the lock teeth; and a ratchet wheel coaxially rotatable relative to the torsion bar, wherein when the relative rotation between the ratchet wheel and the torsion bar is generated, the ratchet wheel causes the pawl to be engaged with the lock teeth.

In addition, in the above-mentioned construction of the seat belt retractor, the control members may comprises:

a control plate rotatable in accordance with the rotation of the torsion bar; and an engagement member engageable with the ratchet wheel and controlled by the control plate, wherein when the engagement member is engaged with the ratchet wheel the control members is in the operable condition, and when the engagement member is disengaged with the ratchet wheel the engagement member is in the inoperable condition.

Further, in the above-mentioned construction of the seat belt retractor, the second lock structure may comprises:

an engaged portion provided at other end portion of the bobbin; and a lock member supported by the base and engageable with the engaged portion.

Furthermore, in the above-mentioned construction of the seat belt retractor, the second lock structure may comprises:

a coupling structure coupling the lock member with the engagement member.

Still furthermore, in the above-mentioned construction of the seat belt retractor, the coupling structure may comprises:

a fitting projection formed on one of the engagement member and the lock member; and a fitted recess, into which the fitting projection fittingly inserted, formed on the other thereof.

Further, in the above-mentioned construction of the seat belt retractor, the lock member and the engagement member may be disposed at a predetermined interval in the axial direction and coaxially rotated.

In the above-mentioned construction of the seat belt retractor, a locking strength of the second lock structure may be set to be lower than that of the first lock structure.

In addition, the above-mentioned object can also be attained by a seat belt retractor according to the present invention, comprising:

a base;

a bobbin around which a webbing is to be wound and coupled with the webbing;

a torsion bar inserted through the bobbin and rotatably supported by the base, the torsion bar being connected integrally with the bobbin; and a lock structure controlled in accordance with the winding amount of the webbing and capable of making a coupling condition in which the base and the bobbin are coupled with each other to prevent the bobbin from rotating in the webbing pull-out direction thereof and a decoupling condition in which the base and the bobbin are decoupled with each other.

In the above-mentioned construction of the seat belt retractor, the lock structure may comprises:

an engaged portion provided on the bobbin;

a lock member supported by the base and engageable with the engaged portion.

Further, in the above-mentioned construction of the seat belt retractor, the lock structure may comprises:

an engaged portion provided on the bobbin;

a lock member supported by the base; and a control plate capable of making a coupling condition in which the lock member and the engaged portion are coupled with each other and a decoupling condition in which the lock member and the engaged portion are decoupled with each other.

Further, the above-mentioned object can also be attained by a seat belt retractor, comprising:

a base;

a bobbin around which a webbing is to be wound and coupled with the webbing;

a torsion bar inserted through the bobbin and rotatably supported by the base, the torsion bar being connected integrally with the bobbin;

a lock structure making a coupling condition in which the base and the bobbin are coupled with each other to prevent the bobbin from rotating in the webbing pull-out direction thereof and a decoupling condition in which the base and the bobbin are decoupled with each other; and control members, in accordance with the winding amount of the webbing, switched between an operable position causing the lock structure to be in the coupling condition and an inoperable position causing the lock structure to be in the decoupling condition.

In the above-mentioned construction of the seat belt retractor, the lock structure may comprises:

an engaged portion provided on the bobbin;

a lock member supported by the base and engageable with the engaged portion.

Further, in the above-mentioned construction of the seat belt retractor, the control members may comprises:

a control plate rotatable in accordance with the rotation of the torsion bar; and an engagement member controlled by the control plate and coupled with the lock member through a coupling structure.

Furthermore, the above-mentioned object can also be attained by a seat belt retractor according to the present invention, comprising:

a base;

a bobbin around which a webbing is to be wound and coupled with the webbing;

a shaft inserted through the bobbin and rotatably supported by the base, the shaft being connected integrally with the bobbin;

an energy absorbing structure disposed between the base and the bobbin;

a lock structure making a coupling condition in which the base and the bobbin are coupled with each other to prevent the bobbin from rotating in the webbing pull-out direction thereof and a decoupling condition in which the base and the bobbin are decoupled with each other; and control member, in accordance with the winding amount of the webbing, switched between an operable position causing the lock structure to be in the coupling condition and an inoperable position causing the lock structure to be in the decoupling condition.

Still furthermore, the above-mentioned object can also be attained by a seat belt retractor according to the present invention, comprising:

a substantially cylindrical bobbin around which a webbing is to be wound;

a torsion bar inserted through the bobbin and rotatably supported by a retractor base, the torsion bar being connected integrally with the bobbin on the one end side thereof and connected integrally with the locking base on the other end side thereof;

first lock member for bringing the locking base into engagement with the retractor base to thereby prevent the rotation of the locking base in the webbing pull-out direction thereof;

lock operating member for operating the first lock member in a vehicle emergency; and control members, in accordance with the winding amount of the webbing, for positioning an engaging member at a first position in which the engaging member is engaged with the lock operating member to thereby operate the first lock member or at a second position in which the engaging member is not engaged with the lock operating member, wherein the control members includes second lock member engageable with the locking base side end portion of the bobbin to prevent the rotation of the bobbin in the webbing pull-out direction thereof and, when the engaging member is positioned at the first position, operates the second lock member.

In addition, the above-mentioned object can be attained by a method of controlling a seat belt retractor including all of an emergency lock mechanism, an automatic lock mechanism and an energy absorbing mechanism, the method according to the present invention comprising the steps of:

keeping the automatic lock mechanism in inoperable condition while both of the emergency lock mechanism and the energy absorbing mechanism are being kept in operable condition;

switching, in accordance with the winding amount of a webbing wound by the retractor, the automatic lock mechanism from the inoperable condition to operable condition and simultaneously switching the emergency lock mechanism and the energy absorbing mechanism from the operable condition to inoperable condition.

In the above-mentioned method of controlling a seat belt retractor according to the present invention, the switching step may be conducted when the winding amount of the webbing is reached at a first predetermined value.

Further, in the above-mentioned method of controlling a seat belt retractor according to the present invention, may further comprises the steps of:

re-switching the automatic lock mechanism from the operable condition to the inoperable condition and simultaneously re-switching the emergency lock mechanism and the energy absorbing mechanism from the inoperable condition to operable condition, when the winding amount of the webbing is reached at a second predetermined value larger than the first predetermined value.

DETAILED DESCRIPTION OF THE PREFERRED EMBODIMENTS

Now, description will be given below in detail of an embodiment of a seat belt retractor according to the invention with reference to the accompanying drawings.

Figure 1:
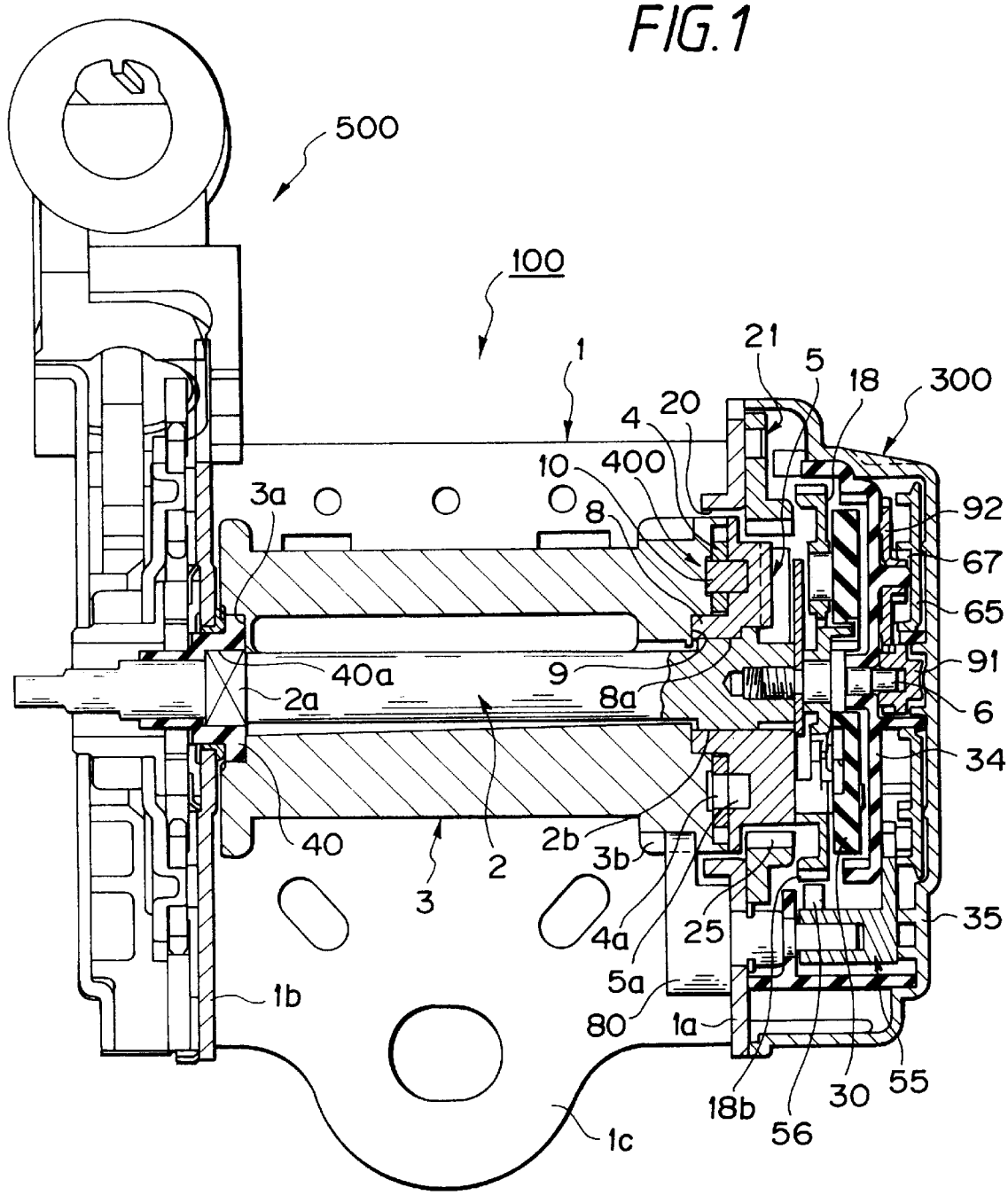
FIG. 1 is a front longitudinal section view of a seat belt retractor 100 according to an embodiment of the invention.
Figure 2:
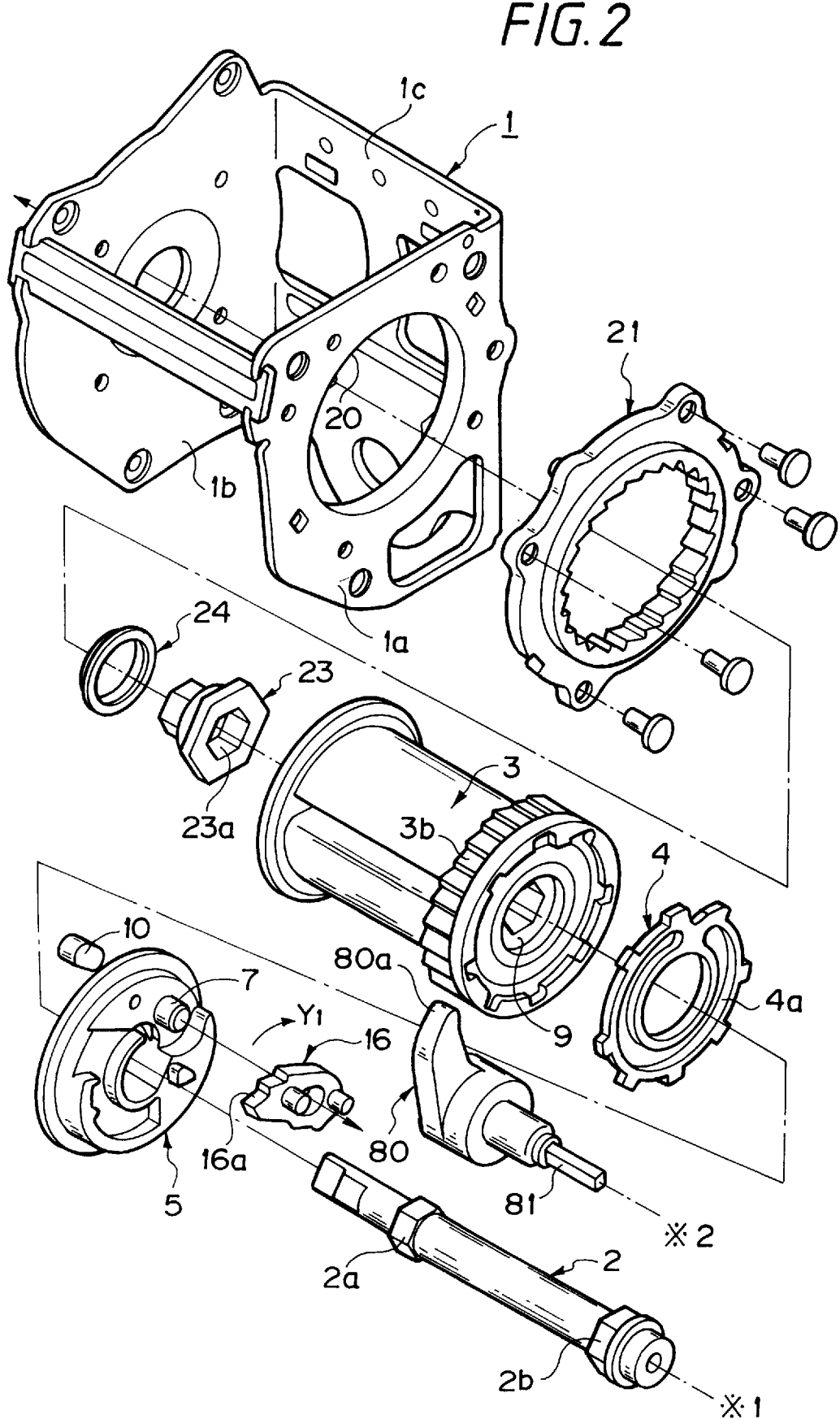
FIG. 2 is a partial view of an exploded perspective view of the main portions of the seat belt retractor shown in FIG. 1.
Figure 3:
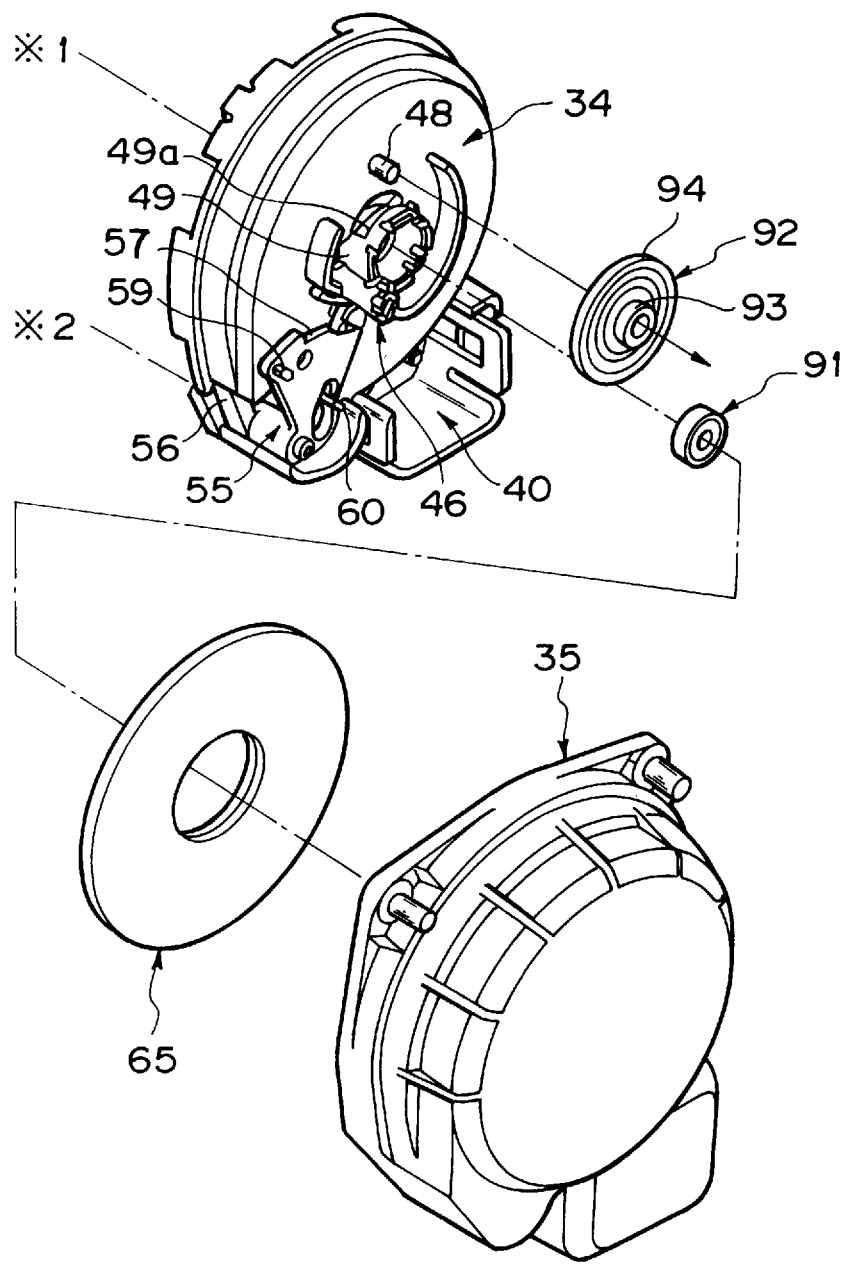
FIG. 3 is an exploded perspective view of the main portions of the remaining part of the seat belt retractor shown in FIG. 2.

FIG. 1 is a front longitudinal section view of a seat belt retractor 100 according to an embodiment of the invention, and FIGS. 2 and 3 are respectively exploded perspective views of the main portions of the seat belt retractor 100 shown in FIG. 1.

The seat belt retractor 100 according to the present embodiment comprises a substantially cylindrical bobbin 3 around which a webbing is to be wound; a cylindrical torsion bar 2 which is inserted through the bobbin 3 and is rotatably supported by a retractor base 1, and also which is connected integrally with the bobbin 3 on one end side (in FIG. 1, on the left side) thereof and is connected integrally with a disk-like locking base 5 on the other end side (in FIG. 1, on the right side) thereof; and, emergency lock member 300 which is used to stop the rotation of the locking base 5 in the webbing pull-out direction thereof.

The retractor base 1 is produced by press forming a metal plate into a shape having a substantially U-shaped section in such a manner that the right and left side plates 1a and 1b thereof respectively rise from the right and left sides of a back plate to be fixed to the body of the vehicle, while the torsion bar 2 combined with the bobbin 3 is rotatably supported at the mutually opposing positions of the right and left side plates 1a and 1b. In one end portion of the torsion bar 2 with the side plate 1a of the retractor base 1 inserted therethrough, there are mounted a pre-tensioner 500 which, in a vehicle emergency, drives the bobbin 3 in the webbing winding direction thereof to thereby remove the loosened portion of the seat belt, and a well-known winding spring device (not shown) which always energizes the bobbin 3 in the webbing winding direction through the torsion bar 2.

The torsion bar 2 includes on one end side thereof a bobbin connecting portion 2a which can be connected with the bobbin 3 in such a manner that it can be rotated integrally with the bobbin 3, and, on the other end side thereof, a locking base connecting portion 2b which can be connected with the locking base 5 in such a manner that it can be rotated integrally with the locking base 5. These two connecting portions 2a and 2b (i.e. a bobbin connecting portion 2a and a locking base connection portion 2b) are respectively so formed as to have a hexagonal section shape.

That is, the bobbin connecting portion 2a has a hexagonal section and is inserted into an insertion hole 23a with a hexagonal section formed in a retainer 23 which is fitted into a fitting recessed portion 3a with a hexagonal section formed on one end side of the bobbin 3, whereby the bobbin connecting portion 2a of the torsion bar 2 is connected with the bobbin 3 in an integrally rotatable manner. By the way, the retainer 23 is rotatably supported by the side plate 1b through a bush 24 and is also connected with a drive member for driving the pre-tensioner 500, so that the retainer 23 can be driven in the webbing winding direction in a vehicle emergency. However, the structure of the pre-tensioner 500 is not directly related to the subject matter of the present invention and thus the detailed description thereof is omitted here.

The locking base connecting portion 2b of the torsion bar 2 has a hexagonal section and is inserted into an insertion hole 8a with a hexagonal section formed in a cylindrical boss portion 8 which is provided on and projected from the bobbin side end face of the locking base 5, whereby the locking base connecting portion 2b is connected with the locking base 5 in such a manner that it can be rotated integrally with the locking base 5.

In the locking base side end portion of the bobbin 3, there is formed a fitting recessed portion 9 for receiving the boss portion 8 of the locking base 5, whereby the bobbin 3 is journaled by the torsion bar 2 through the fitting recessed portion 9 in such a manner that it can be rotated with respect to the torsion bar 2.

Also, stopper member 400, which is disposed in the mutually opposing portions of the locking base 5 and bobbin 3, includes a guide groove 5a which is a C-shaped groove with a bottom cut formed in the bobbin side end face of the locking base 5, a C-shaped guide groove 4a formed in a lock plate 4 which is pressure inserted and fixed to the locking base side end face of the bobbin 3 in such a manner that the guide groove 4a is opposed to the guide groove 5a, and a lock piece 10 which has a substantially cocoon-shaped section and can be slid along the inner wall surfaces of these two guide grooves 5a and 4a, while the stopper member 400 allows the locking base 5 and bobbin 3 to be rotated with respect to each other in the range that the lock piece 10 is slidable with respect to the guide grooves 5a and 4a. By the way, the lock plate 4 is a circular-ring shaped member which is made of a copper plate formed separately from the bobbin 3 formed of aluminum.

Further, in the outer peripheral portion of the locking base side end portion of the bobbin 3, there are cut formed ratchet teeth 3b, and a securing claw 80a of a lock member 80 swingably mounted inside the side plate 1a is engaged with one of the ratchet teeth 3b, thereby forming second lock structure which is used to stop the rotation of the bobbin 3 in the webbing pull-out direction thereof.

And, the torsion bar 2 is structured such that, if a given rotation torque or more is applied between the above-mentioned connecting portions 2a and 2b, then the two connecting portions 2a and 2b are torsionally deformed to thereby be able to absorb shock energy acting on the body of the occupant. That is, the torsion bar 2 provides an energy absorbing mechanism.

According to the invention, as the concrete structure of the emergency lock member 300 which is the first lock structure for restraining the rotation of the locking base 5 in the webbing pull-out direction thereof in a vehicle emergency, there can be employed various kinds of structures. For example, in the present embodiment, as shown in FIG. 2, on the support shaft 7 of the locking base 5, there is journaled a pawl 16 with securing teeth 16a in the leading end thereof in such a manner that it can be rotated. Also, in parallel to the outside of a through hole 20 opened up in the side plate 1a, there is arranged an internal-teeth ratchet 21 including in the inner periphery thereof engaging teeth 25 which can be engaged or meshed by the securing teeth 16a.

And, if a ratchet wheel 18 rotatably journaled on a support pin 6 threadedly mounted on the locking base side end portion of the torsion bar 2 is relatively rotated in the webbing winding direction with respect to the locking base 5, then the pawl 16 is swingably rotated about the support shaft 7 in a direction (in FIG. 2, in a arrow $Y_1$ direction) in which it is engaged with the engaging internal teeth 25 formed in the ratchet 21.

In other words, due to the fact that the pawl 16 is swingably rotated in the direction in which it can be engaged with the engaging internal teeth 25 of the internal-teeth ratchet 21 and the securing teeth 16a of the pawl 16 are engaged with the engaging internal teeth 25, the emergency lock member 300 forms the first lock structure for stopping the rotation of the locking base 5 in the webbing pull-out direction thereof.

Figure 7:
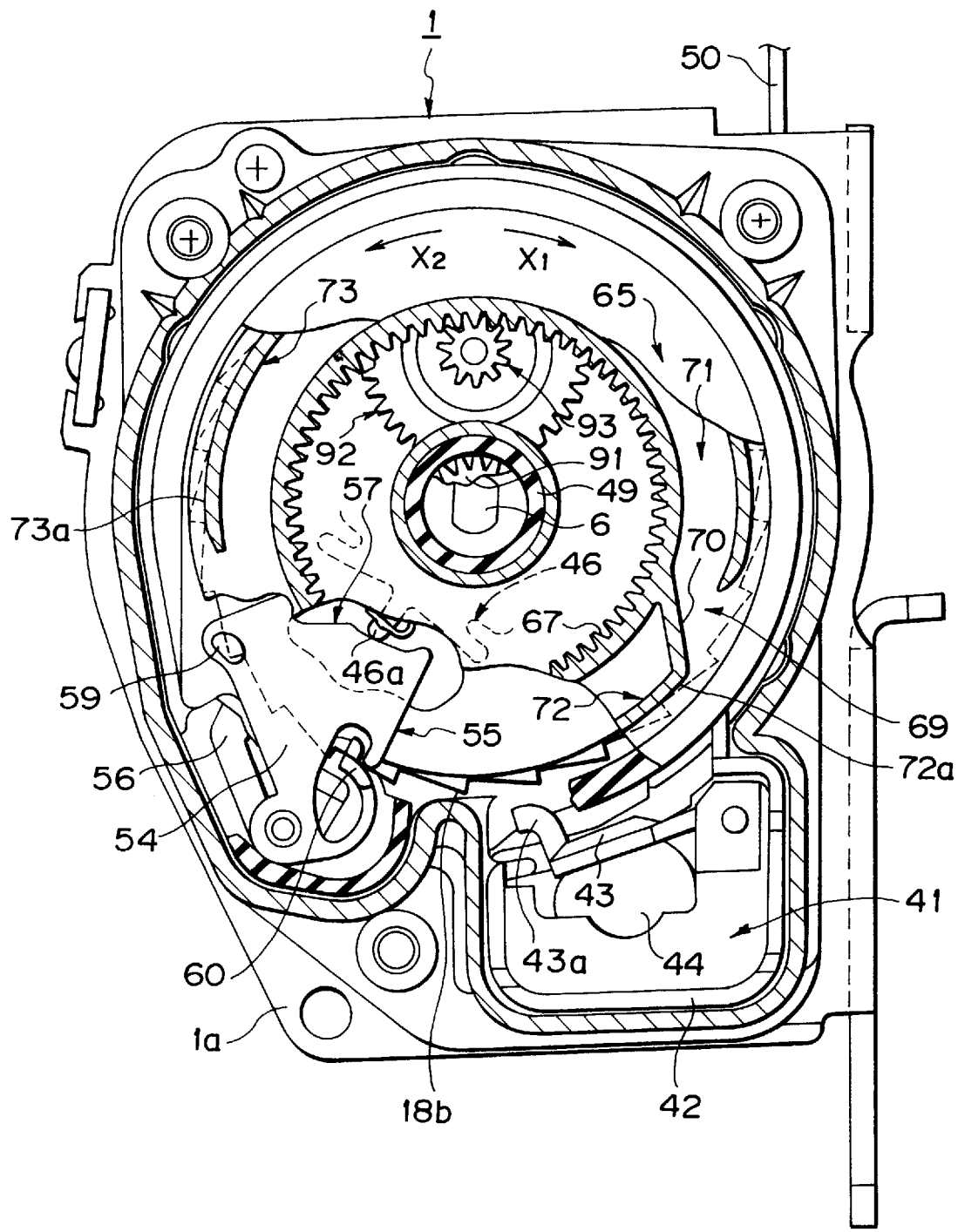
FIG. 7 is a partially broken side view of the seat belt retractor shown in FIG. 1.

And, the above-mentioned ratchet wheel 18 is a ratchet wheel which includes a center hole rotatably journaled by the support pin 6 and, in the outer peripheral portion of the ratchet wheel 18, there are formed ratchet teeth 18b which can be engaged with a sensor arm 43 provided in vehicle body acceleration sensing member 41 (see FIG. 7). Also, an inertia plate 30, which is a disk-shaped inertia member used to form webbing acceleration sensing member, namely, inertia sensing member for sensing the pull-out acceleration of the webbing, is rotatably journaled on the support pin 6.

Accordingly, if the vehicle body acceleration sensing member 41 or webbing acceleration sensing member serving as the inertia sensing member is actuated in an emergency such as a collision or the like, then the ratchet wheel 18 serving as lock operating member is relatively rotated in the webbing winding direction with respect to the locking base 5 to cause the securing teeth 16a of the pawl 16 to mesh with the engaging internal teeth 25 of the internal-teeth ratchet 21, thereby stopping the rotation of the locking base 5 in the webbing pull-out direction thereof, so that the emergency lock member 300 can be operated.

A main gear 91 is fixed to the leading end portion of the support pin 6 inserted through the center hole of a gear case 34 which is disposed outside the inertia plate 30. The gear case 34 includes a support shaft 48 and a boss wall 49 which are respectively provided on and projected from the outer wall of the gear case 34, while the boss wall 49 projects outwardly of the retractor in such a manner that it covers the periphery of the main gear 91. On the support shaft 48, there is rotatably journaled an idle gear 92 including a large gear portion 94 which can be inserted through a cut-away portion 49a of the boss wall 49 and can be engaged or meshed with the main gear 91. At the same time, on the boss wall 49, there is rotatably journaled a control plate 65 serving as a control board which can be deceleratingly rotated due to the meshing engagement of the internal teeth 67 of the control plate 65 with a small gear portion 93 formed in the idle gear 92. And, the control plate 65, which forms control member in cooperation with a lock lever 55 (which will be discussed later), is formed of synthetic resin, while the internal surface of the control plate 65 includes a cam surface which is properly formed so as to constitute the control mechanism.

To a fitting shaft 81 provided in the lock member 80 extending through the side plate 1a and gear case 34, there is connected a lock lever 55 which is an engaging member formed of synthetic resin. And, the lock lever 55 is swingably mounted on the side plate 1a together with the lock member 80. Further, below the gear case 34, there is formed a box-shaped storage portion 40 for storing vehicle body acceleration sensing member 41 which is inertia sensing member for sensing the acceleration of the body of the vehicle.

Figure 4:
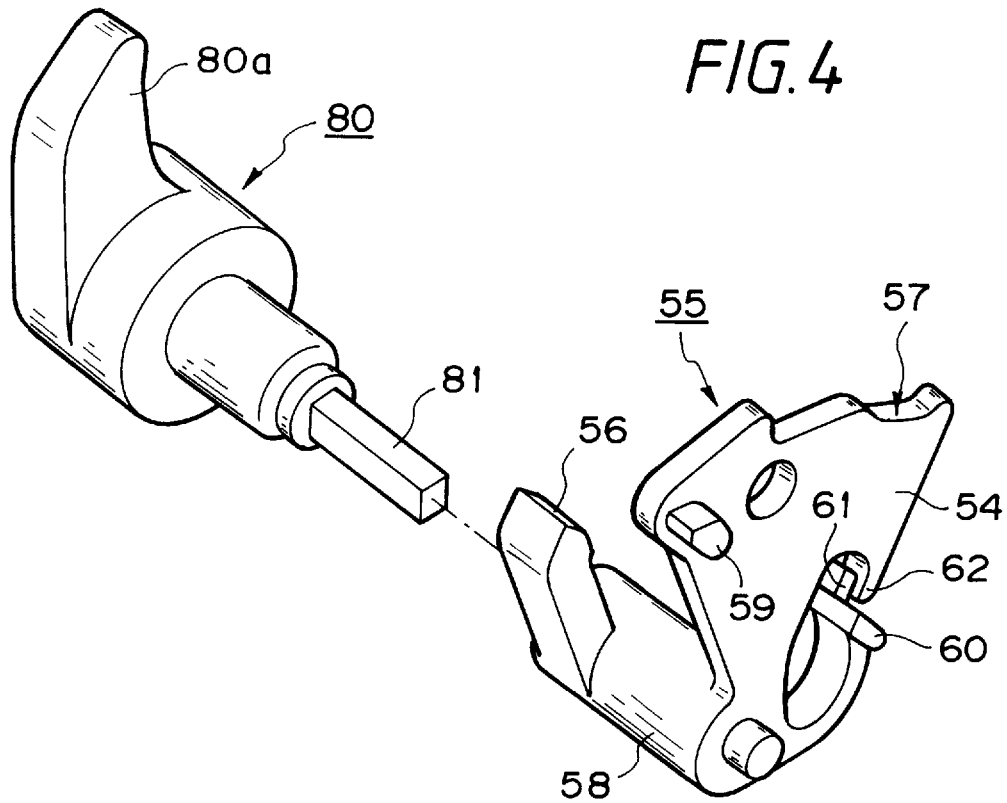
FIG. 4 is a wholly enlarged perspective view of a lock lever and a lock member shown in FIG. 1.
Figure 5:
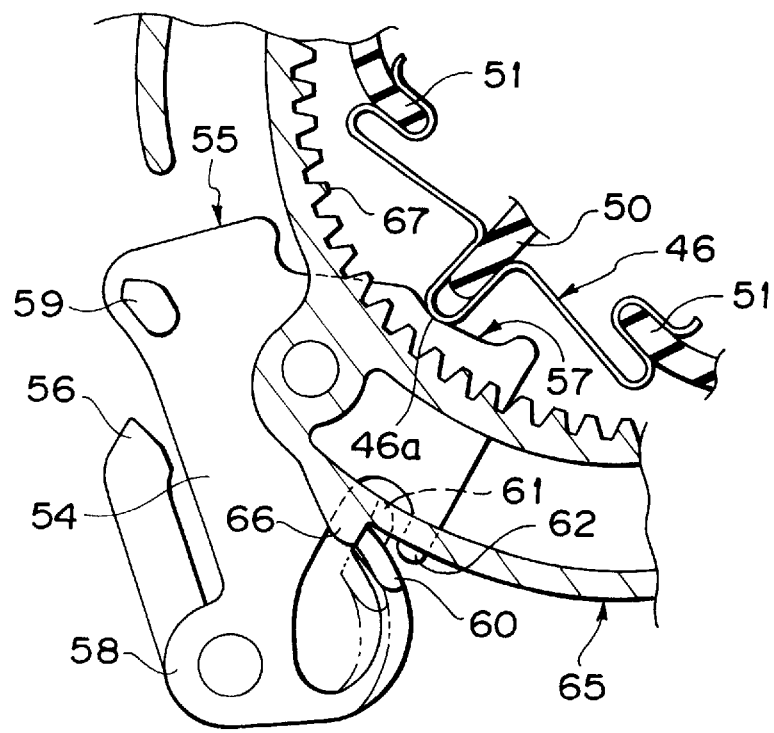
FIG. 5 is a front view of the lock lever shown in FIG. 1.

The lock lever 55, as shown in FIGS. 4 and 5, includes a cylindrical portion 58 to be fitted with the fitting shaft 81, an engaging portion and a swing piece 54 respectively extending outwardly in the radial direction from the cylindrical portion 58, an engaging projection 59 and a flexible engaging portion 60 which are respectively provided on and projected from the swing end portion of the swing piece 54 in such a manner that they can be engaged with the control plate 65, and a cam surface 57 formed in the swing end portion of the swing piece 54.

The cam surface 57 is in engagement with an elastic projecting portion 46a formed in a return spring 46 which is disposed in the outer wall of the gear case 34. In this state, due to an elastic energization force applied to the cam surface 57 from the elastic projecting portion 46a, the lock lever 55 is energized in a direction to cause the engaging portion 56 thereof to be positioned at a first position where it is engaged with the ratchet teeth 18b of the ratchet wheel 18 to thereby stop the rotation thereof or at a second position where it is not engaged with the ratchet teeth 18b. That is, if the elastic projecting portion 46a of the return spring 46 moves beyond the raised portion which provides the neutral position of the cam surface 57, then the lock lever 55 is clickingly operated to hold the engaging portion 56 at the first position or at the second position.

By the way, the return spring 46, as shown in FIG. 5, is formed of a plate spring including the elastic projecting portion 46a which is formed by bending in the central portion thereof. And, the two end portions of the return spring 46 are respectively secured to two support portions 51 and 51 respectively provided on and projected from the outer wall of the gear case 34 and, at the same time, the elastic projecting portion 46a is held in such a manner that it can advance and retreat elastically along a guide portion 50 provided in the gear case 34.

The engaging projection 59 of the lock lever 55 is in engagement with the cam surface of the control plate 65 forming the control mechanism, while the lock lever 55 can be swung along the cam surface of the control plate 65. Also, the flexible engaging portion 60 of the lock lever 55 can be engaged with the engaging projection 66 of the control plate 65. In particular, in the webbing pull-out operation, the lock lever 55 and control plate 65 are contacted with each other in such a manner that their respective tapered surfaces are opposed to each other and, as shown by imaginary lines in FIG. 5, the flexible engaging portion 60 is so flexed as to move beyond the engaging projection 66 and thus the flexible engaging portion 60 escapes from the engaging projection 66, so that the engaging projection 66 of the control plate 65 is allowed to pass by as it is not engaged. On the other hand, in the webbing winding operation, since the lock lever 55 and control plate 65 are contacted with each other in such a manner that their respective vertical surfaces are opposed to each other, the flexible engaging portion 60 is not allowed to flex in a manner to be able to move beyond the engaging projection 66 of the control plate 65 but is pressed against the same, so that the lock lever 55 is swung clockwise in FIG. 5.

As a result of this, the engaging portion 56 of the lock lever 55, with the swinging motion of the lock lever 55, is caused to move to a first position where it is engaged with the ratchet teeth 18b of the ratchet wheel 18 to thereby be able to stop the rotation thereof or a second position where it is not engaged with the ratchet teeth 18b (see FIG. 7). At the same time, a securing claw 80a, which is provided in the lock member 80 connected with the lock lever 55, when the lock lever 55 is held at the first position, is caused to move to a position where it is engaged with the ratchet teeth 3b of the bobbin 3 to thereby be able to stop the rotation of the bobbin 3 in the webbing pull-out direction thereof; and, when the lock lever 55 is held at the second position, the securing claw 80a is caused to move to a position where it is not engaged with the ratchet teeth 3b of the bobbin 3.

Figure 6:
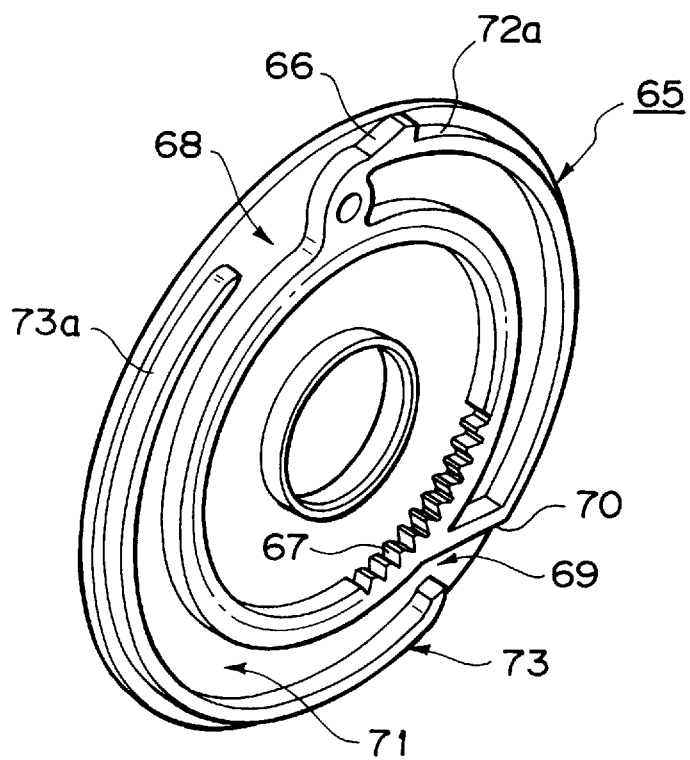
FIG. 6 is a wholly enlarged perspective view of a control plate shown in FIG. 3.

Now, the control mechanism according to the present embodiment is provided between the control plate 65 and lock lever 55 and is structured such that, when the webbing 50 is pulled out by a first given amount or more, it holds the engaging portion 56 of the lock lever 55 at the second position, when the webbing 50 is thereafter wound up to the first given amount, it shifts the engaging portion 56 from the second position to the first position, and when the webbing 50 is further wound by a second given amount or more, it shifts the engaging portion 56 from the first position to the second position. Also, the present control mechanism, as shown in FIGS. 5 and 6, comprises outer peripheral walls 72 and 73 respectively forming outer cam surfaces 72a and 73a which are used to position the engaging projection 59 of the lock lever 55 in the neighborhood of the outer periphery of the control plate to thereby hold the engaging portion 56 of the lock lever 55 at the second position where it is not engaged with the ratchet wheel 18, an inner cam groove 71 which is formed inside the outer wall 73 and positions the engaging projection 59 in the neighborhood of the inner periphery of the control plate to thereby prevent the engaging portion 56 from shifting unnecessarily from the first position where it is engaged with the ratchet wheel 18 to the second position, an introduction portion 68 which, when the webbing 50 is pulled out by an amount equal to or more than a first given amount which provides a condition slightly prior to a condition that the whole amount of the webbing 50 is pulled out, allows the engaging projection 59 of the lock lever 55 to be introduced into the inner cam groove 71, a discharge portion 69 including a cam surface 70 which, when the webbing 50 is wound by an amount equal to or more than a second given amount which provides a condition just prior to a condition that the whole amount of the webbing 50 is wound, allows the engaging projection 59 to shift from the inner can groove 71 to the outer cam surface 72a, the flexible engaging portion 60 of the lock lever 55, and the engaging projection 66 engageable with the flexible engaging portion 60. Further, the present control mechanism is disposed within a sensor cover 35.

Next, description will be given below of the operation of the above-mentioned seat belt retractor 100.

Figure 8:
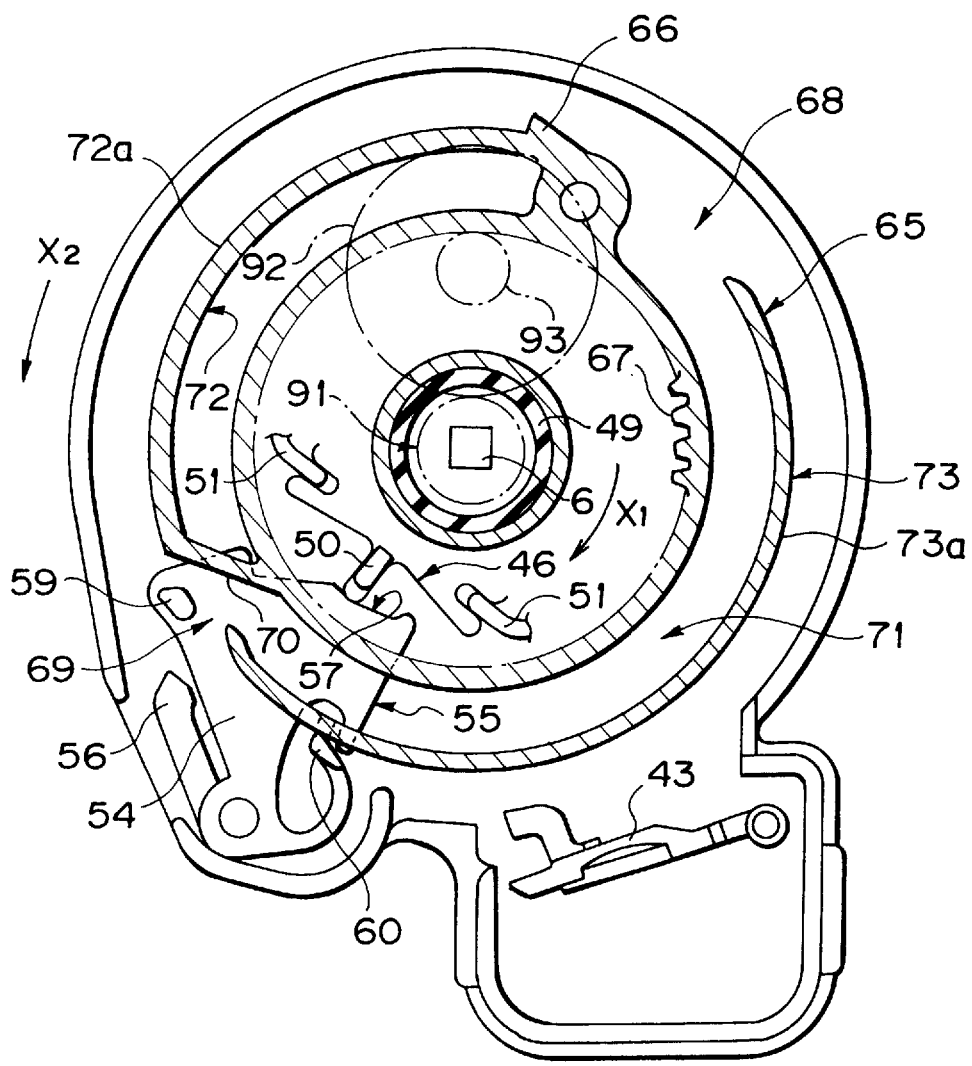
FIG. 8 is a section view of the main portions of the present retractor, explaining an operation to pull out and lock a webbing.

At first, in the webbing whole amount wound condition, the engaging projection 59 of the lock lever 55 is situated on the outer cam surface 72a of the control plate 65 (see FIGS. 7 and 8). In this condition, due to an elastic energization force applied to the cam surface 57 thereof by the elastic projecting portion 46a, the lock lever 55, is held at the second position where the engaging portion 56 thereof is not engaged with the ratchet wheel 18, so that the ratchet wheel 18 can be rotated integrally with the locking base 5.

Next, if the webbing 50 starts to be pulled out from the retractor 100, then the bobbin 3 starts to rotate in a direction of an arrow $X_2$ and thus the main gear 91, which is fixed through the support pin 6 to the end portion of the torsion bar 2 to be rotated by rotation of the bobbin 3, also starts to rotate in the same direction. As a result of this, the control plate 65 starts to rotate in a direction of the arrow $X_1$ while it is decelerated by the idle gear 92, and the engaging projection 59 of the lock lever 55 follows or moves along the outer cam surface 72a.

And, as shown in FIG. 8, when the engaging projection 59 of the lock lever 55 approaches the discharge portion 69 of the control plate 65, because the elastic energization force, which energizes the engaging portion 56 of the lock lever 55 in a direction to guide the same to the second position where it is not engaged with the ratchet wheel 18, is being applied to the cam surface 57 of the lock lever 55 by the elastic projecting portion 46a of the return spring 46, the engaging projection 59 is prevented from entering the inner cam groove 71 through the discharge portion 69.

In this manner, while the engaging projection 59 is present on the outer cam surfaces 72a and 73a of the control plate 65, there is no possibility that the engaging portion 56 of the lock lever 55 can mesh with the teeth 18a of the ratchet wheel 18, that is, the normal emergency lock mechanism is in operation, whereas the automatic lock mechanism is not in operation.

Figure 9:
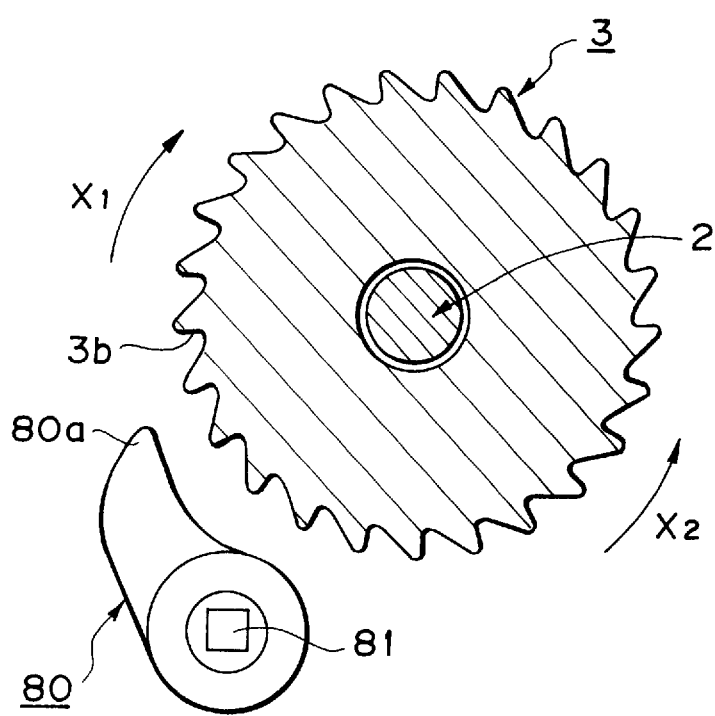
FIG. 9 is a section view of the main portions of a lock member, showing the non-operation condition of the lock member.

On the other hand, in the condition that the engaging portion 56 of the lock lever 55 is held at the second position in the above-mentioned manner, as shown in FIG. 9, the securing claw 80a of the lock member 80 is not engaged with the ratchet teeth 3b of the bobbin 3 and thus the bobbin 3 is free to rotate.

That is, when in normal use, the ratchet wheel 18 is energized in the webbing pull-out direction (in the arrow $X_2$ direction) with respect to the locking base 5, so that the pawl 16 serving as the first lock structure is energized in a direction where it is not engaged with the engaging internal teeth 25. And, the lock member 80 serving as the second lock structure is also not engaged with the ratchet teeth 3b. Thus, the bobbin 3 can be rotated and the webbing can be pulled out freely.

As shown in FIG. 7, when a ball weight 44 provided in the vehicle body acceleration sensing member 41 is placed at a given position in a sensor case 42, a securing projection 43a provided in the before-mentioned sensor arm 43 is not engaged with the ratchet teeth 18a of the ratchet wheel 18, so that the ratchet wheel 18 is allowed to rotate in a manner to follow the locking base 5.

Thus, in an emergency such as a collision or the like, after the vehicle body acceleration sensing member 41 or webbing acceleration sensing member serving as the inertia sensing member is operated to thereby stop the rotation of the ratchet wheel 18 in the webbing pull-out direction thereof, if the webbing 50 is further pulled out from the retractor, then the rotation of the ratchet wheel 18 is delayed with respect to the rotation of the locking base 5 and thus the ratchet wheel 18 is relatively rotated in the webbing winding direction (in the arrow $X_1$ direction), with the result that the emergency lock member 300 serving as the first lock structure is operated. That is, the pawl 16 is swingably rotated about the support shaft 7 in a direction (in FIG. 2, in the arrow $Y_1$ direction) where it can be engaged with the engaging teeth 25, so that the rotation of the locking base 5 in the webbing direction thereof is caused to stop. By the way, if a given large deceleration occurs as in a vehicle collision or the like, then the pre-tensioner 500 is actuated to thereby remove the loosened portion of the seat belt before the emergency lock member 300 is operated.

And, if a given rotation torque or more is applied to the bobbin 3 due to the load acting on the webbing 50, and a given torsional force or more is applied to the torsion bar 2 with the locking base connecting portion 2b thereof secured on the retractor base 1 through the locking base 5 and the bobbin connecting portion 2a thereof connected to the bobbin 3, then the present torsion bar 2 is torsionally deformed. Therefore, in the seat belt retractor 100 according to the invention, when the bobbin 3 is rotated in the webbing unwinding direction thereof, if the torsion bar 2 is torsionally deformed, then, with a given belt tensile force maintained as it is, the webbing 3 is extended to thereby be able to absorb the shock energy effectively, that is, to absorb effectively the shock given to the occupant.

Next, when the webbing 50 is pulled out by an amount equal to or more than a first given amount which provides a condition slightly prior to the condition of the webbing 50 that the whole amount thereof is pulled out and thus the engaging portion 56 of the lock lever 55 reaches the neighborhood of the introduction portion 68 of the control plate 65, the flexible engaging portion 60 of the lock lever 55 is to be engaged with the engaging projection 66 of the control plate 65. In particular, in the webbing pull-out operation, the flexible engaging portion 60 of the lock lever 55 is engaged with the engaging projection 66 of the control plate 65 in such a manner that their respective tapered surfaces are opposed to each other, as shown by imaginary lines in FIG. 5, the flexible engaging portion 60 flexes in a manner to be able to move beyond the engaging projection 66 and thus escapes from the engaging projection 66, which allows the engaging projection 66 of the control plate 65 to pass by as it is not engaged. And, in the webbing whole amount pulled-out condition, the engaging portion 56 of the lock lever 55 remains held at the second position where it is not engaged with the teeth 18a of the ratchet wheel 18.

Therefore, when the flexible engaging portion 60 of the lock lever 55 is engaged with the engaging projection 66 of the control plate 65 due to the fact that the webbing 50 is pulled out by an amount equal to or more than the first given amount, the lock lever 55 remains held in the emergency lock operation condition in which the engaging portion 56 of the lock lever 55 remains held at the second position where it is not engaged with the teeth 18a of the ratchet wheel 18: that is, the engaging portion 56 of the lock lever 55 and the ratchet teeth 18b of the ratchet wheel 18 have a sufficient clearance between them and thus the lock lever 55 is in the stable emergency lock operation condition.

Next, after the webbing 50 is pulled out fully or the whole amount from the retractor, if the webbing 50 starts to be wound around the retractor, then the bobbin 3 starts to rotate in the arrow $X_1$ direction and, at the same time, the main gear 91, which is fixed through the support pin 6 to the end portion of the torsion bar 2 rotatable with the rotation of the bobbin 3, also starts to rotate in the same direction. Thus, the control plate 65, which is decelerated by the idle gear 92, starts to rotate in the arrow $X_2$ direction.

And, when the webbing 50 is wound up to the first given amount and the engaging projection 59 approaches the introduction portion 68 of the control plate 65, as shown in FIG. 5, partly because the engaging projection 66 of the control plate 65 is contacted with the flexible engaging portion 60 of the lock lever 55 in such a manner that their respective vertical surfaces are opposed to each other, and partly because the engaging portion 61 of the swing end thereof is butted against the stopper portion 62 and is thereby prevented against further deformation, the flexible engaging portion 60 is not allowed to flex in a manner to move beyond the engaging projection 66 but is pressed against the engaging projection 66 of the control plate 65, so the lock lever 55 is swung clockwise in FIG. 5.

As a result of this, since the elastic projecting portion 46a, which energizes the engaging portion 56 at the second position through the cam surface 57 of the lock lever 55, moves beyond the cam raised portion which is the neutral position of the cam surface 57 and thus the lock lever 55 is then clicked or operated to a position where the engaging portion 56 can be energized and held at a first position where it is engaged with the ratchet teeth 18b of the ratchet wheel 18 to thereby be able to stop the rotation thereof.

Figure 10:
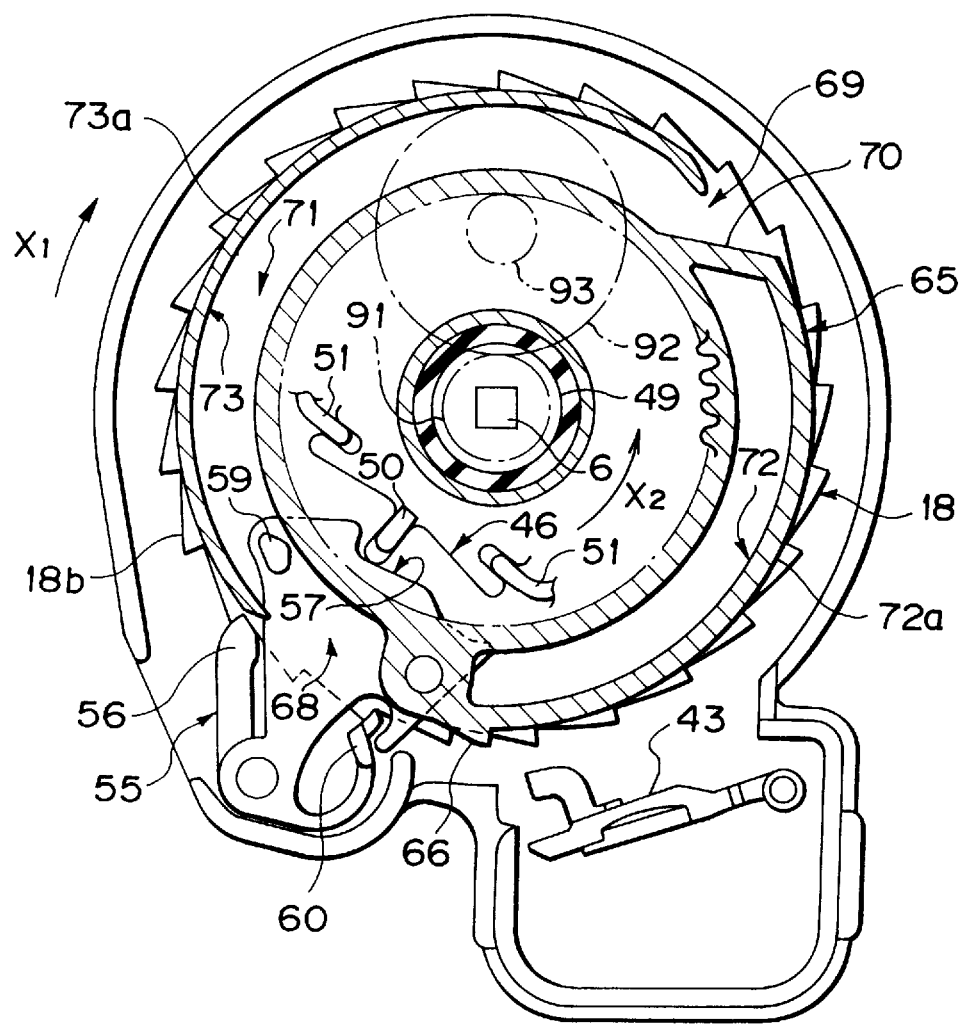
FIG. 10 is a section view of the main portions of the present retractor, explaining an operation to pull out and lock a webbing; and, FIG. 11 is a section view of the main portions of the lock member, showing the operation condition of the lock member.

And, if the webbing is wound around the retractor further, as shown in FIG. 10, the engaging portion 56 is engaged with the ratchet teeth 18b of the ratchet wheel 18 and also the engaging projection 59 enters the inner cam groove 71.

That is, if, after the webbing 50 is pulled out the whole amount from the retractor, the webbing 50 is then wound around the retractor by a small amount, then the engaging projection 66 of the control plate 65 pushes directly against the flexible engaging portion 60 of the lock lever 55, thereby making sure to swing the lock lever 55 from the second position where the engaging portion 56 is not engaged with the ratchet teeth 18b of the ratchet wheel 18 to the first position where the engaging portion 56 is engaged with the ratchet teeth 18b of the ratchet wheel 18.

And, if the webbing 50 is wound around the retractor with the engaging portion 56 engaged with the ratchet teeth 18b of the ratchet wheel 18 in this manner, then the bobbin 3 starts to rotate in the arrow $X_1$ direction and the ratchet wheel 18 also rotates in the same direction. However, because the lock lever 55 can be swung counterclockwise in FIG. 10 against the energization force given by the elastic projecting portion 46a of the return spring 46, and also because the engaging portion 56 in engagement with the ratchet teeth 18b of the ratchet wheel 18 is thereby caused to move beyond the ratchet teeth 18b, there is no possibility that the engaging portion 56 can stop the rotation of the ratchet wheel 18.

Figure 11:
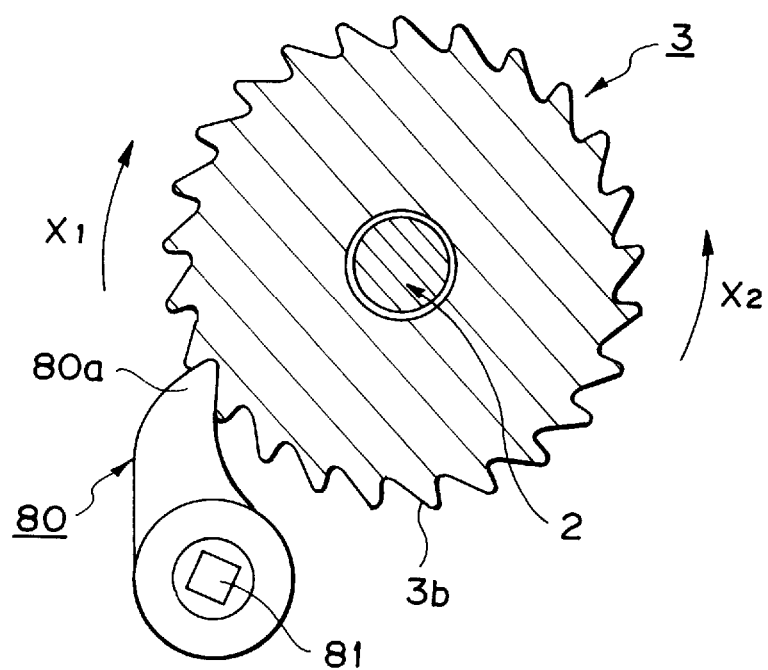

On the other hand, in the above-mentioned condition where the lock lever 55 is held at the first position, as shown in FIG. 11, the securing claw 80a of the lock member 80 serving as the second lock structure is in engagement with the before-described ratchet teeth 3b of the bobbin 3, so that the rotation of the bobbin 3 in the arrow $X_2$ direction, that is, the pulling-out rotation of the webbing is stopped and locked. Also, if the webbing is wound around the retractor with the securing claw 80a engaged with the ratchet teeth 3b, then the bobbin 3 starts to rotate in the arrow $X_1$ direction, whereas the lock member 80 can be swung counterclockwise in FIG. 11 against the energization force of the elastic projecting portion 46a of the return spring 46. Therefore, the securing claw 80a in engagement with the ratchet teeth 3b of the bobbin 3 is caused to move beyond the ratchet teeth 3b, thereby eliminating the possibility that the securing claw 80a can prevent the rotation of the bobbin 3.

As described above, while the lock lever 55 is being energized at the first position by the elastic projecting portion 46a through the cam surface 57, the securing claw 80a of the lock member 80 serving as the second lock structure is always in mesh with the ratchet teeth 3b of the bobbin 3, that is, the automatic lock mechanism is in operation.

In this condition, if the webbing is wound around the retractor, then the control plate 65 starts to rotate in the arrow $X_2$ direction and the engaging portion 56 of the lock lever 55 is allowed to move within the inner cam groove 71. And, if the webbing is wound further, then the engaging projection 59 is shifted to the outer cam surface 72a by the cam surface 70 formed in the discharge portion 69, so that the lock lever 55 is swung in a direction to remove the engagement between the engaging portion 56 and ratchet teeth 18b. At that time, the elastic projecting portion 46a, which energizes the engaging portion 56 at the first position through the cam surface 57 of the lock lever 55, moves beyond the raised portion which is the neutral position of the cam surface 57 and, therefore, at this time, the lock lever 55 is clicked and operated to a position which allows the engaging portion 56 to be energized in a direction where the engaging portion 56 is held at the second position in which it is not engaged with the ratchet teeth 18b of the ratchet wheel 18, thereby removing the engagement between the lock lever 55 and ratchet wheel 18. Also, at the same time when the lock lever 55 is moved to the second position in the above-mentioned manner, the engagement between the securing claw 80a of the lock member 80 and the ratchet teeth 3b of the bobbin 3 is removed.

In this state, in the retractor, while only the emergency lock mechanism is left in operation, the webbing is wound around fully. And, until the webbing is pulled out to the whole amount pulled-out condition, is thereafter wound again around the retractor by a small amount, and the lock lever 55 is switched over to the first position, only the operation of the emergency lock mechanism can be realized.

Further, during the operation of the automatic lock mechanism when the lock lever 55 is situated at the first position, the rotation of the bobbin 3 in the webbing pull-out direction is directly stopped by the lock member 80 in engagement with the ratchet teeth 3b of the bobbin 3. Due to this, the bobbin 3 cannot be rotated by the load applied to the webbing 50, and thus the torsion bar 2 provided between the present bobbin 3 and locking base 5 cannot be deformed torsionally. For this reason, during the operation of the automatic lock mechanism, the energy absorbing mechanism is not operated.

In other words, by a very simple operation that the webbing 50 is pulled out the whole amount and is thereafter wound by a small amount, the above-mentioned seat belt retractor 100 not only can switch its own operation condition from the emergency lock mechanism operation condition over to the automatic lock mechanism operation condition but also can switch the energy absorbing mechanism from its operation condition over to its non-operation condition.

Therefore, in the normal emergency lock mechanism operation condition, when the load acting on the webbing becomes equal to or greater than a preset given value, the seat belt is pulled out a given amount to thereby be able to absorb the shock energy that is given to the body of an occupant. Also, in the automatic lock mechanism operation in which a child seat or the like is fixed to the seat of the vehicle, the energy absorbing mechanism is set in its non-operation condition and the seat belt is pulled out in a vehicle emergency, thereby being able to prevent the child seat or the like from touching the dashboard of the vehicle.

Further, in the seat belt retractor 100 according to the present embodiment, the strength of the ratchet teeth 3b of the bobbin 3, which, when the automatic lock mechanism is in operation, is to be locked to the lock member 80 in order to prevent the rotation of the bobbin 3 in the webbing pull-out direction thereof, is set slightly higher than a shock load acting on the lock portion of the ratchet teeth 3b through the webbing 50 when the child seat is in use and lower than a shock load acting on such lock portion while an adult is using a seat belt.

In other words, in the automatic lock mechanism operation condition, when the child seat is fixed to the seat, the rotation of the bobbin 3 in the webbing pull-out direction thereof can be prevented surely by the lock member 80 serving as the second lock structure and the lock portion of the ratchet teeth 3b; and, when the adult uses the seat belt, the ratchet teeth 3b can be broken to thereby be able to remove the locking of the bobbin 3 by the lock member and the ratchet teeth 3b. By the way, the retractor may also be structured such that the lock member 80 can be broken to thereby remove the above locking of the bobbin 3.

And, when the locking of the bobbin 3 by member of the lock member 80 and ratchet teeth 3b thereof is removed, the bobbin 3 is rotated in the webbing pull-out direction thereof due to the load applied to the webbing 50. However, in the automatic lock mechanism operation condition in which the lock lever 55 is held at the first position, the engaging portion 56 of the lock lever 55 is in engagement with the ratchet teeth 18b of the ratchet wheel 18, thereby preventing the rotation of the ratchet wheel 18 in the belt pull-out direction thereof. For this reason, the rotation of the ratchet wheel 18 is delayed with respect to the rotation of the bobbin 3 in the webbing pull-out direction and thus the ratchet wheel 18 is relatively rotated in the webbing winding direction (in the arrow $X_1$ direction), so that the emergency lock member 300 of the retractor is actuated.

That is, when the adult uses the seat belt device while the automatic lock mechanism remains in operation, in a vehicle collision, the emergency lock member 300 is operated, a rotation torque due to the load acting on the webbing 50 is applied to the torsion bar 2 through the bobbin 3 and a torsional force is thereby applied to the torsion bar 2, with the result that the energy absorbing mechanism is actuated.

Therefore, the above-mentioned seat belt retractor 100, even when the automatic lock mechanism is actuated while the adult is using the seat belt device, can put the energy absorbing mechanism into operation to thereby absorb the shock given to the occupant effectively.

By the way, of course, the control board, engaging member, first lock structure, lock operation member, second lock structure, and the like employed in the invention are not limited to the structures used in the above-mentioned embodiment, but they can be changed or modified in other various manners.

For example, in the above-mentioned embodiment, the lock member 80 serving as the second lock structure is structured such that it is connected with the lock lever 55 serving as the engaging member and can be swung integrally therewith, and, when the control member positions the lock lever 55 at the first position, the lock member 80 is engaged with the ratchet teeth 3b of the bobbin 3. Instead of this, however, there can be employed another structure in which the second lock structure can be controlled independently by some other lever member than the lock lever 55.

Further, in the above-mentioned embodiment, although the second lock structure is structured such that it is directly connected with the lock lever 55, it may be modified to indirectly connect the second lock structure with the lock lever. For example, the second lock structure may be connected with the locking base, and simultaneously this locking base is engaged with the bobbin.

That is, with use of a seat belt retractor according to the invention, in the automatic lock mechanism operation condition in which the engaging member is held at the first position, since the locking base side end portion of the bobbin is prevented by the second lock structure against rotation in the webbing pull-out direction, no torsional force is applied to the torsion bar, so that the energy absorbing mechanism is not operated.

Thus, by a very simple operation that the webbing is pulled out the whole amount and is thereafter wound by a small amount, the present retractor not only allows its operation condition to be switched from the emergency lock mechanism operation condition over to the automatic lock mechanism operation condition, but also can switch the energy absorbing mechanism from its operation condition over to its non-operation condition.

Therefore, in the normal emergency lock mechanism operation condition, when the load acting on the webbing becomes equal to or greater than a preset given value, the seat belt cannot be pulled out by a given amount to thereby be able to absorb the shock energy applied to the body of the occupant. Also, in the automatic lock mechanism operation condition in which a child seat or the like is fixed to the seat of the vehicle, the energy absorbing mechanism is set in its non-operation condition and, in a vehicle emergency, the seat belt cannot be pulled out to thereby be able to prevent the child seat or the like from touching the dashboard of the vehicle.

While there has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A seat belt retractor, comprising:

a base;

a bobbin around which a webbing is to be wound and coupled with said webbing;

a torsion bar inserted through said bobbin and rotatably supported by said base, said torsion bar being connected integrally with said bobbin on the one end side thereof;

first lock structure for making a first condition in which the other end side of said torsion bar is connected with the base and a second condition in which the other end side of said torsion bar is disconnected with the base;

control members, in accordance with the winding amount of the webbing, switched between an operable position causing said first lock structure to be in said first condition and an inoperable position in which said first lock structure is independent of said control members;

a second lock structure capable for making a coupling condition in which said base and said bobbin are coupled with each other and a decoupling condition in which said base and said bobbin are decoupled with each other, wherein when said control members is in said operable position, said second lock structure is brought in said coupling condition.

2. The seat belt retractor according to claim 1, in which said first lock structure comprises:

a lock teeth formed on the base;

a pawl disposed on said other end side of said torsion bar and engageable with said lock teeth; and a ratchet wheel coaxially rotatable relative to said torsion bar, wherein when a relative rotation between said ratchet wheel and said torsion bar is generated, said ratchet wheel causes said pawl to be engaged with said lock teeth.

3. The seat belt retractor according to claim 2, in which said control members comprises:

a control plate rotatable in accordance with the rotation of said torsion bar; and an engagement member engageable with said ratchet wheel and controlled by said control plate, wherein when said engagement member is engaged with said ratchet wheel said control members is in said operable condition, and when said is disengaged with said ratchet wheel said control members is in said inoperable condition.

4. The seat belt retractor according to claim 3, in which said second lock structure comprises:

an engaged portion provided at an end portion of said bobbin; and a lock member supported by said base and engageable with said engaged portion.

5. The seat belt retractor according to claim 4, in which said second lock structure further comprises:

a coupling structure coupling said lock member with said engagement member.

6. The seat belt retractor according to claim 5, in which said coupling structure comprises:

a fitting projection formed on one of said engagement member and said lock member; and a fitted recess, into which said fitting projection fittingly inserted, formed on the other thereof.

7. The seat belt retractor according to claim 4, in which said lock member and said engagement member are disposed at a predetermined interval and mounted for coaxial rotation.

8. The seat belt retractor according to claim 1, in which a locking strength of said second lock structure is lower than that of said first lock structure.

9. A seat belt retractor, comprising:

a substantially cylindrical bobbin around which a webbing is to be wound;

a torsion bar inserted through the bobbin and rotatably supported by a retractor base, the torsion bar being connected integrally with the bobbin on the one end side thereof and connected integrally with a locking base on the other end side thereof;

first lock member for bringing the locking base into engagement with the retractor base to thereby prevent the rotation of the locking base in the webbing pull-out direction thereof;

lock operating member for operating the first lock member in a vehicle emergency; and control members, in accordance with the winding amount of the webbing, for positioning an engaging member at a first position in which the engaging member is engaged with the lock operating member to thereby operate the first lock member or at a second position in which the engaging member is not engaged with the lock operating member, wherein said control members includes second lock member engageable with the locking base side end portion of said bobbin to prevent the rotation of said bobbin in the webbing pull-out direction thereof and, when said engaging member is positioned at said first position, operates said second lock member.

10. A method of controlling a seat belt retractor including all of an emergency lock mechanism, an automatic lock mechanism and an energy absorbing mechanism, said method comprising the steps of:

keeping the automatic lock mechanism in inoperable condition while both of the emergency lock mechanism and the energy absorbing mechanism are being kept in operable condition;

switching, in accordance with the winding amount of a webbing wound by said retractor, said automatic lock mechanism from the inoperable condition to operable condition and simultaneously switching said emergency lock mechanism and said energy absorbing mechanism from the operable condition to inoperable condition.

11. The method of controlling a seat belt retractor according to claim 10, in which said switching step is conducted when the winding amount of the webbing is reached at a first predetermined value.

12. The method of controlling a seat belt retractor according to claim 11, further comprising the steps of:

re-switching said automatic lock mechanism from the operable condition to the inoperable condition and simultaneously re-switching said emergency lock mechanism and said energy absorbing mechanism from the inoperable condition to operable condition, when said winding amount of the webbing is reached at a second predetermined value larger than said first predetermined value.

* * * * *